US011423312B2

(12) United States Patent
Choi et al.

(10) Patent No.: US 11,423,312 B2
(45) Date of Patent: Aug. 23, 2022

(54) METHOD AND APPARATUS FOR UNIVERSAL PRUNING AND COMPRESSION OF DEEP CONVOLUTIONAL NEURAL NETWORKS UNDER JOINT SPARSITY CONSTRAINTS (71) Applicant: Samsung Electronics Co., Ltd., Gyeonggi-do (KR)

(72) Inventors: Yoo Jin Choi, San Diego, CA (US); Mostafa El-Khamy, San Diego, CA (US); Jungwon Lee, San Diego, CA (US)

(73) Assignee: Samsung Electronics Co., Ltd ( * ) Notice: Subject to any disclaimer, the term of this patent is extended or adjusted under 35 U.S.C. 154(b) by 1003 days.

(21) Appl. No.: 16/141,035

(22) Filed: Sep. 25, 2018

(65) Prior Publication Data
US 2019/0347554 A1    Nov. 14, 2019

Related U.S. Application Data (60) Provisional application No. 62/671,311, filed on May 14, 2018.

(51) Int. Cl.
G06N 3/08     (2006.01)
G06F 17/15    (2006.01)
G06F 7/02     (2006.01)
G06N 3/04     (2006.01)

(52) U.S. Cl.
CPC .............. *G06N 3/082* (2013.01); *G06N 3/04* (2013.01)

(58) Field of Classification Search
CPC ........ G06N 3/082; G06N 3/04; G06N 3/0454; G06N 3/08

USPC ......................................................... 706/1–62
See application file for complete search history.

(56) References Cited

U.S. PATENT DOCUMENTS

| 6,360,019 | B1 | 3/2002 | Chaddha |
| 6,473,534 | B1 | 10/2002 | Merhav et al. |
| 6,670,907 | B2 | 12/2003 | Cho |
| 2001/0017941 | A1 | 8/2001 | Chaddha |
| 2017/0344876 | A1* | 11/2017 | Brothers .................. G06N 3/04 |

(Continued)

FOREIGN PATENT DOCUMENTS

| CN | 106290412 | | 3/2018 | |
| CN | 107832837 | | 3/2018 | |
| EP | 3657399 | * | 5/2018 | ............. G06N 3/063 |

OTHER PUBLICATIONS

Liu1, et al., "Pruning of Winograd and FFT based convolution algorithm", Convolutional Neural Network and Visual Recognition, 2016 (Year: 2016).*

(Continued)

Primary Examiner — Brandon S Cole
(74) Attorney, Agent, or Firm — The Farrell Law Firm, P.C.

(57) ABSTRACT

A method and system for constructing a convolutional neural network (CNN) model are herein disclosed. The method includes regularizing spatial domain weights, providing quantization of the spatial domain weights, pruning small or zero weights in a spatial domain, fine-tuning a quantization codebook, compressing a quantization output from the quantization codebook, and decompressing the spatial domain weights and using either sparse spatial domain convolution and sparse Winograd convolution after pruning Winograd-domain weights.

20 Claims, 5 Drawing Sheets

(56) References Cited

U.S. PATENT DOCUMENTS

| | | | |
|---|---|---|---|
| 2018/0130178 A1 | 5/2018 | Wang et al. | |
| 2018/0336462 A1* | 11/2018 | Brothers | G06F 17/153 |
| 2019/0130250 A1* | 5/2019 | Park | G06N 5/046 |
| 2019/0138902 A1* | 5/2019 | Matveev | G06V 10/82 |
| 2019/0347554 A1* | 11/2019 | Choi | G06N 3/04 |
| 2020/0008779 A1* | 1/2020 | Goksel | G01S 7/52036 |
| 2020/0234124 A1* | 7/2020 | Park | G06N 3/0481 |
| 2021/0374509 A1* | 12/2021 | Liu | G06N 3/0454 |

OTHER PUBLICATIONS

Y. LeCun et al., "Deep learning," Nature, vol. 521, No. 7553, pp. 436-444, 2015.
V. Sze et al., "Efficient processing of deep neural networks: A tutorial and survey," Proceedings of the IEEE, vol. 105, No. 12, pp. 2295-2329, 2017.
Y. Cheng et al., "Model compression and acceleration for deep neural networks: The principles, progress, and challenges," IEEE Signal Processing Magazine, vol. 35, . . . No. 1, pp. 126-136, 2018.
S. Han et al., "Deep compression: Compressing deep neural networks with pruning, trained quantization and Huffman coding," in International Conference on Learning . . . Representations, pp. 14, 2016.
Y. Choi et al., "Towards the limit of network quantization," in International Conference on Learning Representations, pp. 14, 2017.
K. Ullrich et al., "Soft weight-sharing for neural network compression," in International Conference on Learning Representations, pp. 16, 2017.
E. Agusston et al., "Soft-to-hard vector quantization for end-to-end learning compressible representations," in Advances in Neural Information Processing Systems, 2017, . . . pp. 1141-1151.
C. Louizos et al., "Bayesian compression for deep learning," in Advances in Neural Information Processing Systems, 2017, pp. 3290-3300.
Y. Choi, et al., "Universal deep neural network compression," arXiv preprint arXiv:1802.02271, pp. 5, 2018.
A. Krizhevsky et al., "Imagenet classification with deep convolutional neural networks," in Advances in Neural Information Processing Systems, 2012, pp. 1097-1105.
K. He et al., "Deep residual learning for image recognition," arXiv preprint arXiv: 1512.03385, pp. 9, 2015.
M. Mathieu et al., "Fast training of convolutional networks through FFTs," arXiv preprint arXiv:1312.5851, pp. 9, 2013.
N. Vasilache et al., "Fast convolutional nets with fbfft: A GPU performance evaluation," arXiv preprint arXiv:1412.7580, pp. 17, 2014.
A. Lavin et al., "Fast algorithms for convolutional neural networks," in Proceedings of the IEEE Conference on Computer Vision and Pattern Recognition, 2016, pp. 4013-4021.
S. Han et al., "Learning both weights and connections for efficient neural net work," in Advances in Neural Information Processing Systems, 2015, pp. 1135-1143.
V. Lebedev et al., "Fast convnets using group-wise brain damage," in Proceedings of the IEEE Conference on Computer Vision and Pattern Recognition, 2016, pp. 2554-2564.
W. Wen et al., "Learning structured sparsity in deep neural networks," in 464 Advances in Neural Information Processing Systems, 2016, pp. 2074-2082.
Y. Guo et al., "Dynamic network surgery for efficient DNNs," in Advances in Neural Information Processing Systems, 2016, pp. 1379-1387.
J. Park et al., "Faster CNNs with direct sparse convolutions and guided pruning," International Conference on Learning Representations, pp. 12, 2017.
J. Lin et al., "Runtime neural pruning," in Advances in Neural Information Process ing Systems, 2017, pp. 2178-2188.
S. Li et al., "Enabling sparseWinograd convolution by native pruning," arXiv preprint arXiv:1702.08597, pp. 8, 2017.
X. Liu et al., "Efficient sparse-Winograd convolutional neural networks," in International Conference on Learning Representations, pp. 10, 2018.
I. W. Selesnick et al., "Fast convolution and filtering," pp. 8-2, 1998.
S. Chetlur et al., "cuDNN: Efficient primitives for deep learning," arXiv preprint arXiv: 1410.0759, pp. 9, 2014.
FALCON library: Fast image convolution in neural networks on Intel architecture, Date last accessed: Apr. 25, 2018. [Online]. . . Available: https://colfaxresearch.com/falcon-library, pp. 5.
A. Gersho, "Asymptotically optimal block quantization," IEEE Transactions on information Theory, vol. 25, No. 4, pp. 373-380, 1979.
R. M. Gray et al., "Quantization," IEEE Transactions on Information Theory, vol. 44, No. 6, pp. 2325-2383, 1998.
J. Ziv, "On universal quantization," IEEE Transactions on Information Theory, vol. 31, No. 3, pp. 344-347, 1985.
R. Zamir et al., "On universal quantization by randomized uniform/lattice quantizers," IEEE Transactions on Information Theory, vol. 38, No. 2, pp. 428-436, 1992.
J. Ziv et al., "A universal algorithm for sequential data compression," IEEE Transactions on Information Theory, vol. 23, No. 3, pp. 337-343, 1977.
J. Ziv et al., "Compression of individual sequences via variable-rate coding," IEEE Transactions on Information Theory, vol. 24, No. 5, pp. 530-536, 1978.
T. A. Welch, "A technique for high-performance data compression," Computer, vol. 6, No. 17, pp. 8-19, 1984.
M. Effros et al., "Universal lossless source coding with the Burrows Wheeler transform," IEEE Transactions on Information Theory, vol. 48, No. 5, pp. 1061-1081, 2002.
J. Seward, "bzip2," 1998. [Online]. Available: www.bzip.org.
J.-L. Gailly and M. Adler, "gzip," 2003. [Online]. Available: www.gzip.org.
O. Russakovsky et al., "Imagenet large scale visual recognition challenge," International Journal of Computer Vision, vol. 115, No. 3, pp. 211-252, 2015.
D. Kingma et al., "Adam: A method for stochastic optimization," arXiv preprint arXiv:1412.6980, 2014, pp. 15.
K. Simonyan et al., Very deep convolutional networks for large-scale image recognition. arXiv preprint arXiv:1409.1556, 2014.

* cited by examiner

METHOD AND APPARATUS FOR UNIVERSAL PRUNING AND COMPRESSION OF DEEP CONVOLUTIONAL NEURAL NETWORKS UNDER JOINT SPARSITY CONSTRAINTS

PRIORITY

This application claims priority under 35 U.S.C. § 119(e) to a U.S. Provisional patent application filed on May 14, 2018 in the United States Patent and Trademark Office and assigned Ser. No. 62/671,311, the entire contents of which are incorporated herein by reference.

FIELD

The present disclosure relates generally to a method and apparatus, and more particularly, to a method and apparatus utilizing a convolutional neural network (CNN).

BACKGROUND

Deep learning with convolutional neural networks (CNNs) has recently achieved performance breakthroughs in many computer vision applications. The progress of modern CNNs comes with very deep and complex multi-layer architectures having a large number of learnable parameters. The large model size and huge computational complexity hinder the deployment of state-of-the-art CNNs on resource-limited platforms such as battery-powered mobile devices. Hence, it is of great interest to compress complex CNN models into compact forms to lower their memory requirements and to reduce their computational costs.

SUMMARY

According to one embodiment, a method is provided. The method includes regularizing spatial domain weights, providing quantization of the spatial domain weights, pruning small or zero weights in a spatial domain, fine-tuning a quantization codebook, compressing a quantization output from the quantization codebook, and the spatial domain weights and using either sparse spatial domain convolution and sparse Winograd convolution after pruning Winograd-domain weights.

According to one embodiment, a system is provided. The system includes a processor and a non-transitory computer readable storage medium configured to store instructions that, when executed, cause the processor to regularize spatial domain weights, provide quantization of the spatial domain weights, prune small or zero weights in a spatial domain, fine-tune a quantization codebook, compress a quantization output from the quantization codebook, decompress the spatial domain weights and use either sparse spatial domain convolution and sparse Winograd convolution after pruning Winograd-domain weights.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1'," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

CNN size compression has been actively investigated for memory and storage size reduction. Typical compression of CNNs may be achieved using weight pruning, weight quantization (e.g., using k-means clustering and Huffman coding), further analysis and mathematical optimization. In particular, universal CNN compression to achieve universally efficient CNN compression for any CNN models by randomized (dithered) weight quantization and universal source coding has been described in U.S. patent application Ser. No. 15/433,531, filed on Feb. 15, 2017, entitled "Method and Apparatus for Neural Network Quantization and U.S. patent application Ser. No. 15/697,035, filed on Sep. 6, 2017, entitled "Method and Apparatus for Neural Network Quantization", the contents of which are incorporated herein by reference.

Furthermore, it is also desired to have CNN computational complexity reduction. The major computational cost of deep CNNs is due to multiply-accumulate (MAC) operations in the convolutional layers. For example, a typical AlexNet model in requires 724M MACs to process one image while 92% of the MACs (666M MACs) come from its convolutional layers. A typical VGG-16 model in requires 15.5G MACs per one input image and 99% of the MACs (15.3G MACs) are consumed in its convolutional layers. A typical ResNet-152 model includes only convolutional layers except the final fully-connected layer and 11.3G MACs are used in its convolutional layers to process one image.

To reduce the complexity of CNN convolution, a typical method is to use either frequency-domain convolution or Winograd convolution. In particular, for typical small-size filters such as 3×3 filters, Winograd convolution is shown to be more efficient than frequency-domain convolution. Another typical method is to use weight pruning to reduce MACs in convolution by skipping MACs for pruned weights (small or zero weights).

The present system and method includes regularizing spatial domain weights using Winograd domain regularization or a Winograd domain regularizer (e.g., partial L2 regularization) for generating sparse Winograd filters in a Winograd domain, regularizing spatial domain weights using spatial domain regularization or a spatial domain regularizer (e.g., partial L2 regularization) for generating sparse spatial domain filters, providing quantization (e.g., uniform quantization) of the spatial domain weights; pruning small or zero weights in the spatial domain, fine-tuning the quantization codebook with the Winograd domain regularization but only non-zero code values, and compressing the quantization output from the quantization codebook (e.g., with universal lossless coding). The present system may further decompress the compressed model in inference and the decompressed model can utilize spatial domain convolution while reducing the complexity by skipping MACs for pruned weights. The decompressed model can be transformed to the Winograd domain and can utilize Winograd convolution of lower complexity in inference while reducing complexity by skipping MACs for pruned weights in the Winograd domain.

The present system and method compresses the parameters (i.e., weights) of a CNN in order to curtail the storage/memory requirements, while reducing the computational complexity of convolution by pruning weights and skipping MAC operations for pruned weights in convolution. The present system and method may be applied any type of CNN model for compression and complexity reduction, without deviating from the scope of the present disclosure. In particular, the present system and method includes a framework for hardware and/or software platform independent pruning and compression of CNNs that allows pruning and compression of CNNs, decompression of CNNs, and deployment of CNNs on either hardware that performs spatial domain convolution, or lower-complexity hardware that performs Winograd convolution, while being pruned in either the spatial domain or the Winograd domain for additional computational efficiency.

The present system and method produces a compressed CNN model with convolutional filters that are sparse in the spatial domain and also in the Winograd domain after Winograd transformation. Therefore, one compressed CNN model may be deployed for any platform that supports either spatial domain convolution or Winograd convolution, and the sparsity of its convolutional filters can be utilized for complexity reduction in either domain.

The present system and method compresses and generates one spatial domain CNN model that may be re-trained to have sparse convolutional filters both in the spatial domain and in the Winograd domain. The present system and method regularizes spatial domain weights by Winograd domain regularization (e.g., partial L2 regularization (using the partial sum of the squared values of the parameters of the regularization term) for generating sparse Winograd filters in the Winograd domain. The present system and method further regularizes spatial domain weights by spatial domain regularization (e.g., partial L2 regularization) for generating sparse spatial domain filters. The present system and method applies regularization for weights with magnitudes that are less than a threshold, where the threshold is determined from an r-th percentile of the weight magnitude values and may be updated every iteration of training. The regularization coefficient may be a learnable parameter that gradually increases as training goes on by a penalty term for a small regularization coefficient. The present system and method decompresses the compressed sparse CNN model and uses either sparse spatial domain convolution or sparse Winograd convolution after pruning.

Instead of training Winograd domain filters directly and storing the Winograd domain filters, the present system and method trains the spatial domain filters and compresses the spatial domain filters in the spatial domain while regularizing the spatial domain filters to be sparse in the Winograd domain as well when they are transformed to the Winograd domain. In this way, the present system and method develops one trained and compressed model that can utilize any of the sparse spatial domain convolution and the sparse Winograd convolution. The model may be compressed in the spatial domain since there are a smaller number of weights in the spatial domain. However, the compressed model may utilize Winograd convolution after Winograd transformation.

The present system regularizes the spatial domain filters to be sparse in the Winograd domain as well as in the spatial domain by re-training and/or fine-tuning CNNs with Winograd domain regularization (e.g., partial L2 regularization) and spatial domain regularization (e.g., partial L2 regularization). Partial L1 or other regularization methods may be used without deviating from the scope of the present disclosure.

To obtain an improved compression ratio, the model is compressed in the spatial domain that has a fewer number of parameters. Due to the regularization, the universal CNN compression system and method produces one compressed CNN model that has sparse convolutional filters both in the spatial domain and in the Winograd domain, so that the model can utilize any sparse spatial domain convolution or sparse Winograd convolution. Thus, after decompression, the model is represented in the spatial domain and the convolutions are already sparse.

The present system provides re-training of the CNN to run the decompressed model in the Winograd domain, which generally requires less computational cycles, if the hardware or software platform supports it, by transforming the sparse spatial domain convolutions to Winograd convolutions. The present system also allows pruning in the Winograd domain without notable loss in accuracy.

For illustration purposes, consider a typical CNN model having L convolutional layers (for simplicity, fully-connected or pooling layers are omitted). The input of layer l has $C_l$ channels of size $H_l \times W_l$ and the output has $D_l$ channels of size $H_l - r_l + 1 \times W_l - r_l + 1$, where the input is convolved with $D_l$ filters of size $r_l \times r_l \times C_l$ with no padding. For $1 \leq l \leq L$, $1 \leq i \leq C_l$, and $1 \leq j \leq D_l$, $x_l(i)$ and $y_l(j)$ are the 2D input and output feature maps of channel i and channel j, respectively for layer l, and $w_l(i,j)$ is the two-dimensional (2D) convolutional filter for input channel i and output channel j of layer l. As shown in Equation (1), the convolutional layer l produces $$y_l(j) = \Sigma_{i=1}^{C_l} w_l(i,j) * x_l(i), \quad (1)$$

for $1 \leq j \leq D_l$, where * denotes 2D spatial domain convolution.

Spatial-domain convolution is equivalent to element-wise product in the frequency domain or in the Winograd domain. Moreover, Winograd convolution is known to be the convolution that requires the minimum number of multiplications possible.

Given a 2D input feature map of size W×H and a 2D filter of size r×r, Winograd convolution works on the patches of size m×m, extracted from the input feature map. Each of the m×m patches is convolved with the r×r filter using Winograd convolution to produce an output patch of size m−r+1×m−r+1. The m×m input patches are extracted with stride of m−r+1×m−r+1 from the input feature map. After Winograd convolution for every patch, the outputs are assembled into an output feature map. This reduces to a spatial domain convolution in the case of n=r.

In an example, x and y are one of the m×m input patches and its corresponding output patch respectively. w is the r×r filter. For Winograd convolution, the input and the filter are transformed into the Winograd domain using Winograd transform matrices F and G, respectively, as shown in Equation (2), as follows:

$$X = FxF^T, W = GwG^T \quad (2)$$

$A^T$ denotes the matrix transpose of some matrix A. X is the Winograd domain feature map and W is the Winograd domain filter, respectively. In the Winograd domain, both X and W are of size m×m, and element-wise product follows. The output is transformed back to the spatial domain using matrix A as shown in Equation (3), as follows:

$$y = A^T(GwG^T) \odot (FxF^T)A, \quad (3)$$

$\odot$ denotes the element-wise product of two matrices. The transformation matrices F, G, and A are (r,n)-specific and may be obtained from the Chinese remainder theorem.

For example, as shown in Equation (4), for r=3 and m=4

$$F = \begin{bmatrix} 1 & 0 & 0 & 0 \\ 0 & 1 & -1 & 1 \\ -1 & 1 & 1 & 0 \\ 0 & 0 & 0 & -1 \end{bmatrix}, G = \begin{bmatrix} 1 & 0 & 0 \\ 0.5 & 0.5 & 0.5 \\ 0.5 & -0.5 & 0.5 \\ 0 & 0 & 1 \end{bmatrix}, A = \begin{bmatrix} 1 & 0 \\ 1 & 1 \\ 1 & -1 \\ 0 & -1 \end{bmatrix} \quad (4)$$

For sparse Winograd convolution, the Winograd domain filter W as described in Equation (2) is directly learned while the following form of Winograd convolution is used in loss and gradient computation of training, as shown in Equation (5):

$$y = A^T(W \odot (F^T x F))A. \quad (5)$$

For Winograd domain weight pruning, a pruning mask matrix may be defined, denoted by P, of the same size as W, that modifies Equation (5) into Equation (6):

$$y = A^T((W \odot P) \odot (F^T x F))A, \quad (6)$$

The elements of P are set to be zero if a corresponding Winograd domain filter weight is less than a threshold, and the elements of P are set to be one if the corresponding Winograd domain filter weight is not less than the threshold. The threshold is selected to achieve a desired pruning rate. The Winograd domain weights are forced to be zero effectively when their values are less than some threshold while optimizing unpruned ones.

One drawback of this approach is that the trained model requires a Winograd convolution engine for inference as well, since the Winograd filters are not invertible to the spatial domain due to the fact that the inversion is over-determined. Another disadvantage is that the number of weights to store increases after Winograd transformation and thus more storage/memory is required for Winograd domain models.

For a spatial domain filter w, the present system can transform it into a Winograd domain filter W by Winograd transformation. The present system makes both w and W sparse while only saving w for one compressed model. The present system regularizes the weights in w and W based on a respective spatial domain regularization coefficient and a Winograd domain regularization coefficient so that w and W are both sparse.

Figure 1:
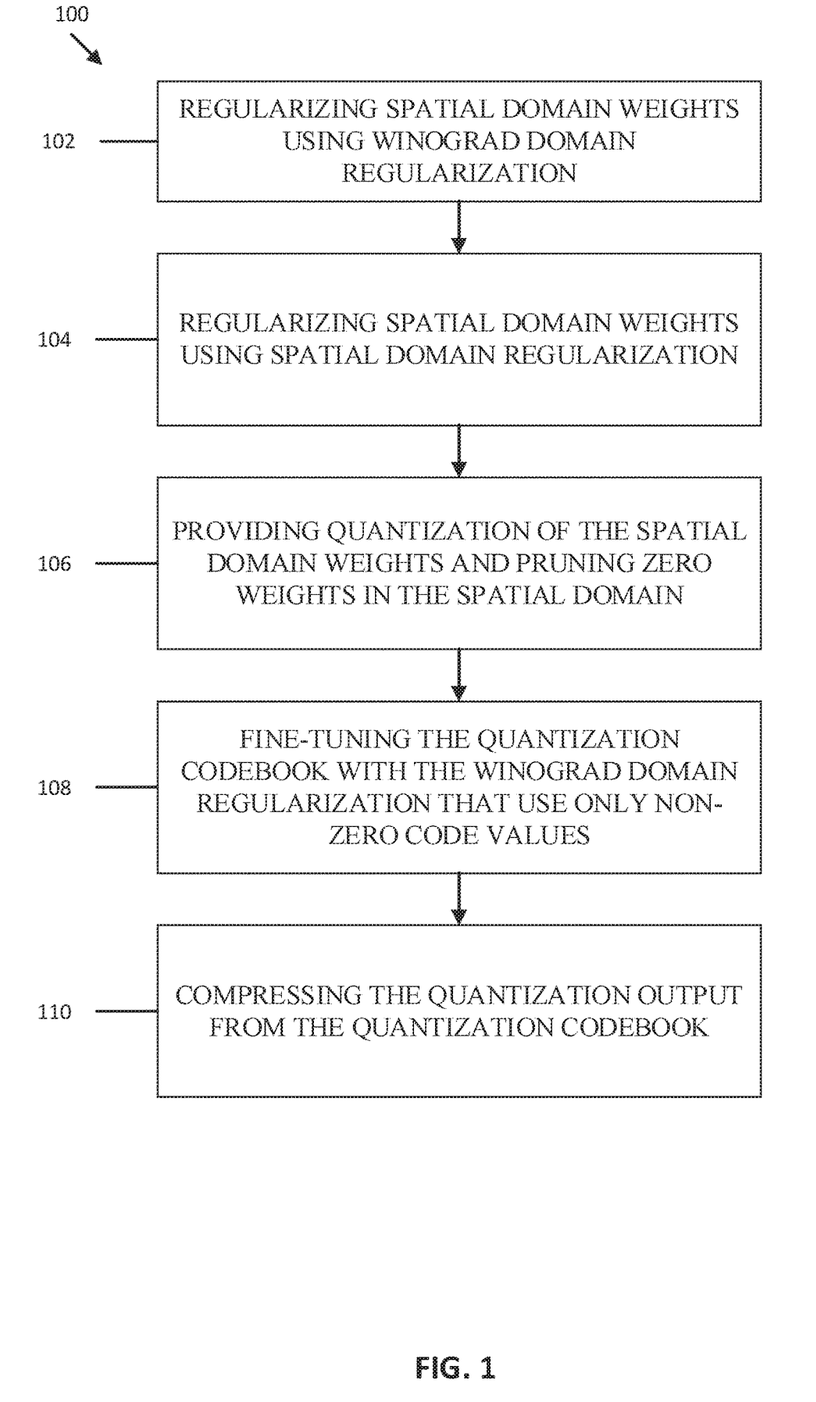
FIG. 1 is a flowchart for a method of producing a compressed CNN, according to an embodiment.

FIG. 1 is a flowchart 100 for a method of producing a compressed CNN, according to an embodiment. At 102, spatial domain weights are regularized using Winograd domain regularization. Instead of training Winograd domain filters and pruning some of the Winograd domain filters directly in the Winograd domain, the present system and method trains spatial domain filters while regularizing the spatial domain filters to be sparse in the Winograd domain. w is the set of all convolutional filters of L layers (i.e., $w \equiv \{w_l(i,j), 1 \leq l \leq L, 1 \leq i \leq C_l,$ and $1 \leq j \leq D_l\}$) which are learnable. Given any matrix A, $1_{|A| \leq \theta}$ is defined as a matrix that as the same size as A while its element is one if the corresponding element $\alpha$ in A satisfies $|\alpha| \leq \theta$ and is zero otherwise. The present system may include a Winograd domain partial L2 regularization defined as in Equation (7) follows:

$$R_{WD}(w; \theta) = \|(GwG^T) \odot P_{WD}(\theta_r)\|_2^2, \text{ or} \quad (7)$$

$$R_{WD}(w; \theta_{WD}) = \frac{1}{N_{WD}} \sum_{l=1}^{L} \sum_{i=1}^{C_l} \sum_{j=1}^{D_l} \left\|(G_l w_l(i,j) G_l^T) \odot 1_{|G_l w_l(i,j) G_l^T| \leq \theta_{WD}}\right\|^2$$

$\|\cdot\|$ denotes the L2 norm and $G_l$ is the Winograd transformation matrix determined by the filter size and the input patch size for Winograd convolution at layer l. $N_{WD}$ is the total number of Winograd domain weights of all L layers. $\theta_r$ or $\theta_{WD}$ is a threshold value and $P_{WD}(\theta_r)$ is the pruning mask matrix similar to Equation (6). L2 regularization is applied only for a portion of Winograd domain weights based on their magnitude values. Due to this regularization, spatial domain weights are regularized to yield diminishing Winograd domain weights in part after training, and such insignificant Winograd domain weights may be pruned in inference for sparse Winograd convolution at negligible loss. Given a desired pruning rate r>0, the threshold $\theta_r$ may be set to be the r-th percentile of Winograd domain weight magnitude values. The threshold is updated at every training iteration as the weights are updated. Separate threshold values or one common threshold value for different layers may be selected to control the sparsity of each layer.

For regularized training, the cost function C to minimize in training is defined as Equation (8):

$$C(X;w) = E(X;w) + e^{\lambda} R_{WD}(w;\theta_r) - \alpha\lambda \quad (8)$$

where X is the training dataset, E(X; w) is the target loss function for the main network (e.g., the cross-entropy for classification problems or mean-squared-error loss function for regression problems).

It is noted that the $e^{\lambda}$ is used as the regularization coefficient such that the regularization coefficient is always positive. Instead of using a fixed regularization coefficient, (i.e., a fixed value for $\lambda$) the present system may provide a learnable regularization coefficient. Starting from a small or predefined coefficient value, the present system learns a CNN model with little regularization and little performance loss. An additional regularization term (e.g., $-\alpha\lambda$ for $\alpha > 0$) may be introduced to penalize small regularization coefficients and encourage them to increase in training. With a penalty term $\alpha\lambda$, for $\alpha > 0$, the learnable regularization coefficient gradually increases as training goes on and there can finally have a high volume of Winograd domain weights close to zero.

Description related to learnable regularization coefficient can be found in U.S. patent application Ser. No. 15/914,229, filed on Mar. 7, 2018, entitled "Method and Apparatus for Learning Low-Precision Neural Network that Combines Weight Quantization and Activation Quantization", the entire contents of which are incorporated herein by reference.

The Winograd domain partial L2 regularization may assume a zero-mean Gaussian prior for partial Winograd domain weights within the threshold value where the negative log-likelihood of the Gaussian prior may be used as the regularization term. The regularization coefficient $e^{\lambda}$ as described in Equation (8) can be related to the variance of the Gaussian prior (i.e., the reciprocal of the variance corresponds to the regularization coefficient $e^{\lambda}$). In such a Bayesian model, the present system may consider the variance of the Gaussian prior as a random variable and find the optimal variance by learning, which leads to the learnable regularization coefficient implementation with the penalty term in Equation (8). Since there is no knowledge on the variance, no prior distribution for the variance is assumed (i.e., uniform distribution may be assumed over $(0, \infty)$ for the variance).

Regularization of the spatial domain weights using Winograd domain regularization at 102 may utilize gradient descent. For gradient descent, the following may be defined as Equations (9) and (10):

$$\nabla_w C = \nabla_w E + e^{\lambda} \nabla_w R_{WD}, \quad (9)$$

where $$\nabla_w R_{WD} = 2G^T((GwG^T) \odot P(\theta_r))G \quad (10)$$

For example, for r=3 and m=4, simply assuming that $P(\theta_r)=1$ (no pruning), it follows from Equations (4) and (10) that Equation (11) is derived:

$$\nabla_w R_{WD} = 2 \begin{bmatrix} 1 & 0 & 0 \\ 0.5 & 0.5 & 0.5 \\ 0.5 & -0.5 & 0.5 \\ 0 & 0 & 1 \end{bmatrix}^T \left( \begin{bmatrix} 1 & 0 & 0 \\ 0.5 & 0.5 & 0.5 \\ 0.5 & -0.5 & 0.5 \\ 0 & 0 & 1 \end{bmatrix} \begin{bmatrix} w_{11} & w_{12} & w_{13} \\ w_{22} & w_{22} & w_{23} \\ w_{31} & w_{32} & w_{33} \end{bmatrix} \begin{bmatrix} 1 & 0 & 0 \\ 0.5 & 0.5 & 0.5 \\ 0.5 & -0.5 & 0.5 \\ 0 & 0 & 1 \end{bmatrix}^T \right) \begin{bmatrix} 1 & 0 & 0 \\ 0.5 & 0.5 & 0.5 \\ 0.5 & -0.5 & 0.5 \\ 0 & 0 & 1 \end{bmatrix} = \quad (11)$$

-continued $$\frac{1}{2}\begin{bmatrix} 9w_{11}+3w_{13}+3w_{31}+w_{33} & 3w_{12}+w_{32} & 3w_{11}+9w_{13}+w_{31}+3w_{33} \\ 3w_{21}+w_{23} & w_{22} & w_{21}+3w_{23} \\ 3w_{11}+w_{13}+9w_{31}+3w_{33} & w_{12}+3w_{32} & w_{11}+3w_{13}+3w_{31}+9w_{33} \end{bmatrix}$$

where $$w = \begin{bmatrix} w_{11} & w_{12} & w_{13} \\ w_{22} & w_{22} & w_{23} \\ w_{31} & w_{32} & w_{33} \end{bmatrix},$$

that implies $\nabla_{w_{11}} R_{WD} = (9w_{11}+3w_{13}+3w_{31}+w_{33})/2$.

Moreover, $\lambda$ may be updated by gradient descent using Equation (12):

$$\nabla_\lambda C = \nabla_\lambda R_{WD} = e^\lambda R_{WD} - \alpha \quad (12)$$

It may be observed that $e^\lambda$ tends to $\alpha/R_{WD}$ and as the regularizer $R_{WD}$ decreases, the regularization coefficient $e^\lambda$ gets larger. A larger regularization coefficient further regularizes Winograd domain weights to move towards zero in the following update. In this way, the present system may gradually sparsify the Winograd domain filters while updating the spatial domain weights in training.

At 104, spatial domain weights are regularized using spatial domain regularization.

Similar to the regularization for sparse Winograd domain filters, the present system may prune spatial domain weights with regularized training. Similar to Equation (5), the present system may use a spatial domain partial L2 regularizer as in Equation (13):

$$R_{SD}(w; \theta_r) = \|w \odot P_{SD}(\theta_r)\|_2^2, \text{ or} \quad (13)$$

$$R_{SD}(w; \theta_{SD}) = \frac{1}{N_{SD}} \sum_{l=1}^{L} \sum_{i=1}^{C_l} \sum_{j=1}^{D_l} \|w_l(i,j) \odot 1_{|w_l(i,j)| \leq \theta_{SD}}\|^2$$

where $\theta_r$ or $\theta_{SD}$ is some threshold value and $P_{SD}(\theta_r)$ is the pruning mask matrix in the spatial domain.

Given an original CNN model, the present system performs spatial domain weight pruning if possible. The present system defines a cost function with the spatial domain and the Winograd domain partial L2 regularization for convolutional filters as in Equations (14) and (15):

$$C(X;w) = E(X;w) + e^{\lambda_{WD}} R_{WD}(w; \theta_{WD}(r_{WD})) + e^{\lambda_{SD}}(w; \theta_{SD}(r_{SD})) - \alpha_{WD}\lambda_{WD} - \alpha_{SD}\lambda_{SD}, \quad (14)$$

where $$R_{WD}(w;\theta) = \|(GwG^T) \odot P_{WD}(\theta)\|_2^2, R_{SD}(w;\theta) = \|w \odot P_{SD}(\theta)\|_2^2. \quad (15)$$

where $\theta_{WD}(r_{WD})$ and $\theta_{SD}(r_{SD})$ are the threshold values for pruning, given desired pruning ratios $r_{WD}$ and $r_{SD}$, in the Winograd domain and in the spatial domain, respectively, and $\alpha_{WD} > 0$ and $\alpha_{SD} > 0$ are hyper parameters selected and fixed before training.

Figure 2:
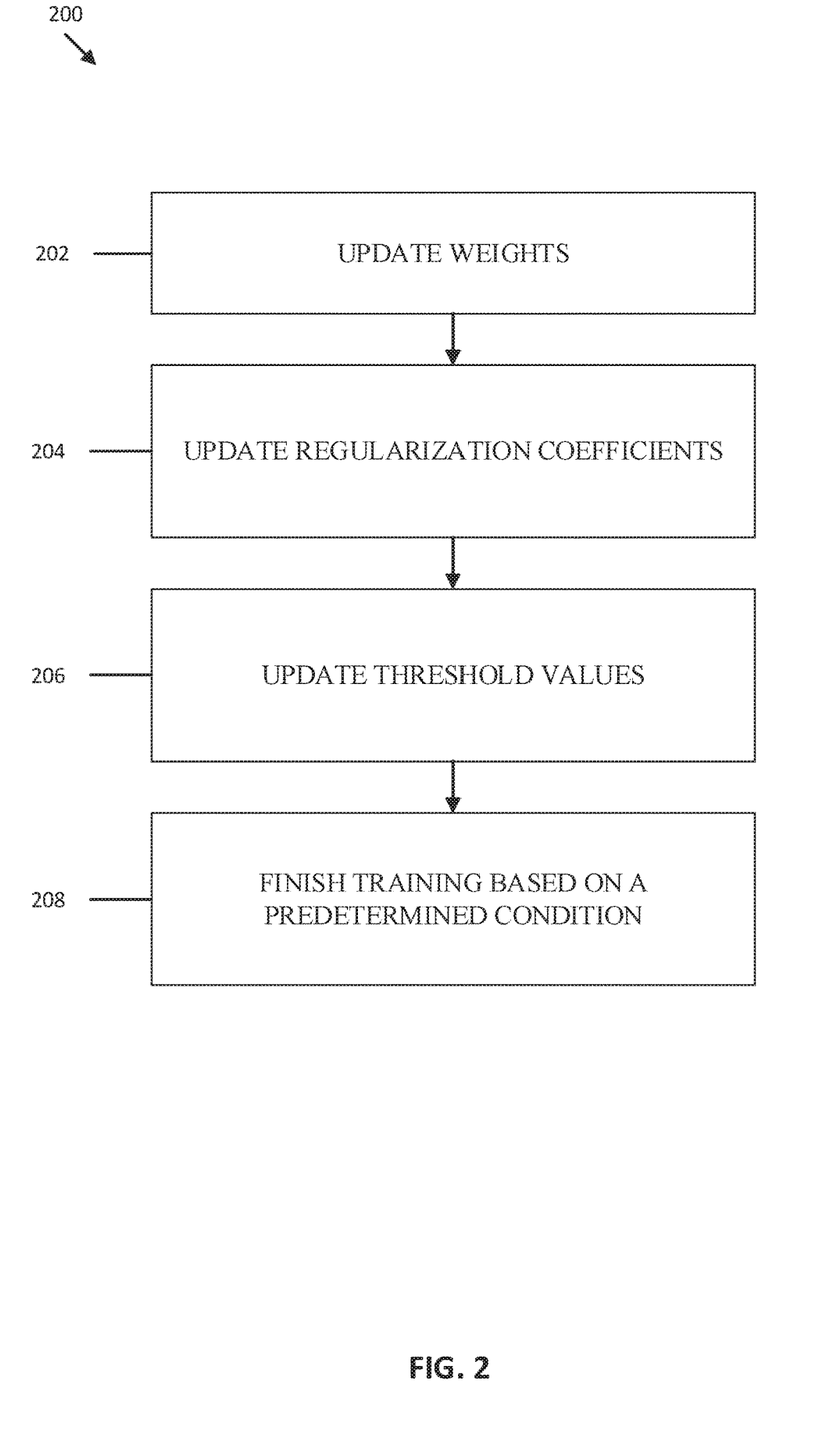
FIG. 2 is a flowchart for a method of retraining a CNN, according to an embodiment.

FIG. 2 is a flowchart 200 for a method of retraining a CNN, according to an embodiment. In the flowchart 200, the present system further re-trains the network using stochastic gradient decent with mini-batches. At 202, weights are updated. The weights may be updated in w using gradients from Equation (16):

$$\nabla_w C = \nabla_w E + e^{\lambda_{WD}} \nabla_w R_{WD} + e^{\lambda_{SD}} \nabla_w R_{SD} \quad (16)$$
$$= \nabla_w E + e^{\lambda_{WD}}(2G^T((GwG^T) \odot P_{WD}(\theta_{WD}(r_{WD})))G) +$$
$$e^{\lambda_{SD}}(2w \odot P_{SD}(\theta_{SD}(r_{WD})))$$

At 204, regularization coefficients are updated. The regularization coefficients, $\lambda_{WD}$ and $\lambda_{sp}$, may be updated using the gradient from Equation (17):

$$\nabla_{\lambda_{WD}} C = \nabla_{\lambda_{WD}} R_{WD} = e^{\lambda_{WD}} R_{WD} - \alpha_{WD},$$
$$\nabla_{\lambda_{SD}} = \nabla_{\lambda_{SD}} = e^{\lambda_{SD}} R_{SD} - \alpha_{SD} \quad (17)$$

At 206, threshold values are updated. The threshold values $\theta_{WD}(r_{WD})$ and $\theta_{SD}(r_{SD})$ may be updated to be $r_{WD}$-th percentile and $r_{SD}$-th percentile of Winograd domain and spatial domain weight magnitude values, respectively.

At 208, the training is finished based on a predetermined condition. For example, training may finish if $\lambda_{WD} > \Gamma_{WD}$ and $\lambda_{sp} > \Gamma_{SD}$ for predetermined positive constants $\Gamma_{WD}$ and $\Gamma_{SD}$ being large enough or the number of iterations is larger than a predetermined limit.

After sparsifying filters both in the Winograd domain and in the spatial domain by regularization, the sparse CNN model may be further compressed by universal compression in the spatial domain, according to one embodiment. Universal compression includes three steps as follows.

Referring back to FIG. 1, at 106, quantization of the spatial domain weights is provided and small or zero weights in the spatial domain are pruned. The present system may further perform uniform or dithered uniform quantization of the spatial domain weights and prune small or zero weights in the spatial domain. Spatial domain weights may be randomized by adding uniform random dithers. For example, if $\omega_1, \omega_2, \ldots \omega_{N_{SD}}$ are the spatial domain individual weights for quantization, where $N_{SD}$ is the total number of spatial domain weights, they may be randomized by Equation (18):

$$\tilde{\omega}_i = \omega_i + U_i, \quad (18)$$

where $U_1, U_2, \ldots U_{N_{SD}}$ are independent and identically distributed uniform random variables, the support of the uniform distribution is $$\left[-\frac{\Delta}{2}, \frac{\Delta}{2}\right],$$

and $\Delta$ is the quantization interval of the following uniform quantization. After random dithering, weights may be quantized using the uniform codebook of interval $\Delta$ in Equation (19):

$$q_i = \Delta \cdot \text{rounded}(\tilde{\omega}/\Delta), \quad (19)$$

where the rounding function is $\text{round}(x) = \text{sign}(x)\lfloor |x| + 0.5 \rfloor$. After quantization, the present system prunes small or zero weights and fixes the pruned weights to be zero for the rest of fine-tuning and compression steps. For unpruned weights, the present system may cancel the random dithers back from the uniform quantization output only to have, as in Equation (20):

$$\hat{q}_i = \begin{cases} q_i - U_i = \Delta \cdot \text{round}((w_i + U_i)/\Delta) - U_i, & q_i > 0, \\ 0, & q_i = 0, \end{cases} \quad (20)$$

where $\hat{q}_l$ is the final universal quantization output for weight $\omega_i$. Any type of quantization method may be used without deviating from the present disclosure.

At 108, the quantization codebook is fine-tuned with the Winograd domain regularization that uses only non-zero code values. The present system further fine-tunes the uniform codebook with the Winograd domain partial L2 regularization by only fine-tuning non-zero code values to compensate accuracy loss after quantization. Then, their shared quantized value in the codebook is updated by gradient descent using the average gradient, which is given by Equation (21):

$$c_n(t) = c_n(t-1) - \eta \frac{1}{|C_n|} \sum_{i \in C_n} \nabla_{w_i} C(t-1), \quad (21)$$

where t is the iteration time, η is the learning rate, and $C_n$ is the index set of all weights that are quantized to the same value $c_n = n\Delta$, for some non-zero integer n. After the codebook is updated, individual weights are updated following their shared quantized value in the codebook as in Equation (22):

$$\hat{q}_i(t) = c_n(t) - U_i, \forall i \in C_n, \quad (22)$$

for n≠0. Pruned weights are not fine-tuned and remain zero. For sparse Winograd domain filters, the present system maintains the Winograd domain partial L2 regularizer in the codebook fine-tune step. The spatial domain partial L2 regularizer may not be included since spatial domain pruned weights are kept to be zero after quantization.

At 110, the quantization output from the quantization codebook is compressed. The present system compresses the quantization output with universal lossless coding. In source coding after randomized quantization, the encoder and the decoder share information on random dithers (i.e., $U_1$, $U_2$, . . . $U_{N_{SD}}$). Under this assumption, the encoder adds dithers back and encodes the uniform quantization output (i.e., $q_i$). On the other hand, the decoder decodes the uniform quantization output and then cancels the random dithers to decompress the randomized quantization output. To avoid sharing random dithers, the present system may use a pseudo-random number generator known to both the encoder and the decoder. It is appreciated that any type of compression coding may be used without deviating from the scope of the present disclosure.

Figure 3:
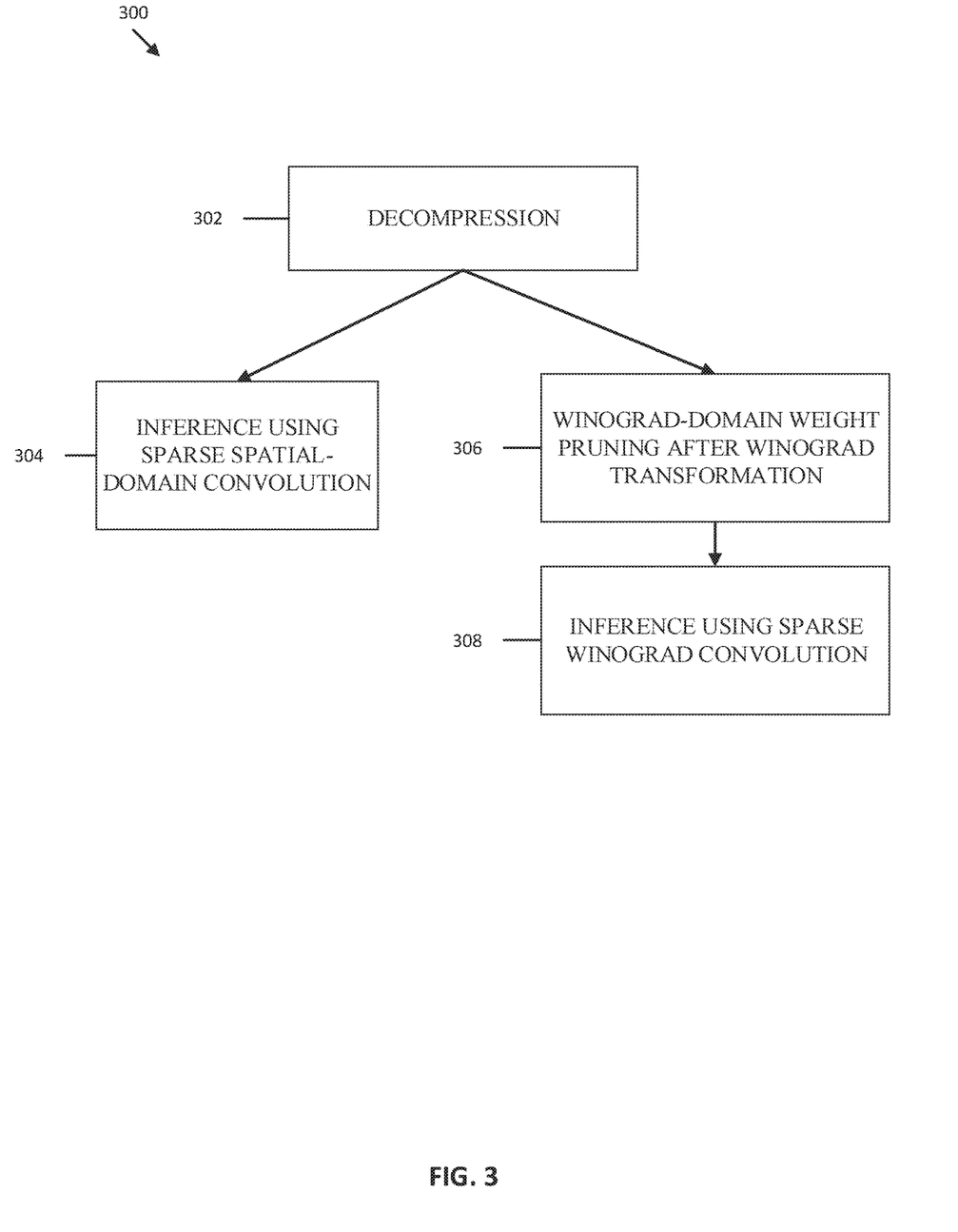
FIG. 3 is a flowchart for a method of decompressing a CNN model, according to an embodiment.

FIG. 3 is a flowchart 300 for a method of decompressing a CNN model, according to an embodiment. At 302, decompression is initiated. Decompression may be performed on the compressed bit stream to obtain quantized spatial-domain weights. At 304, for spatial domain convolution, inference is performed using sparse spatial domain convolution. The decompressed spatial-domain weights may be used directly for spatial-domain convolution in inference. For Winograd convolution, at 306, Winograd-domain weight pruning is performed after Winograd transformation (e.g., transformation of the decompressed spatial domain filters to the Winograd domain). The spatial-domain weights may be converted (transformed) to Winograd-domain weights, and then the Winograd-domain weights may be pruned up to the desired sparsity level. The Winograd-domain weights may be pruned based on their magnitude values (e.g., pruning the Winograd-domain weights that are smaller than a predetermined threshold value in their magnitude). The pruned Winograd-domain weights may be used for Winograd convolution. At 308, inference is performed using sparse Winograd convolution.

The experiment results may be presented for the universal CNN compression system for both sparse Winograd convolution and sparse spatial domain convolution. The system may be evaluated for a pruned AlexNet. The system may prune a pre-trained AlexNet model by incremental pruning and re-training for an image dataset. As a result, the system prunes 90% spatial domain weights mostly from fully-connected layers.

The system re-trains the pruned AlexNet based on the Winograd domain partial L2 regularization coefficient and the spatial domain partial L2 regularization coefficient. In particular, the system applies the regularizers on Conv2 to Conv5 layers of the AlexNet model and re-train their weights. For other layers, the already pruned weights are fixed to be zero and only unpruned weights are re-trained with Conv2 to Conv5 weights.

Using the spatial domain (SD) weight regularization only, the filters in Conv2 to Conv5 are sparse in the spatial domain but are not in the Winograd domain. Therefore, the performance degrades significantly after being transformed to the Winograd domain and pruned. However, if both the spatial domain and the Winograd domain (WD) regularization are applied (SD+WD), the filters in Conv2 to Conv 5 become sparse in both domains, and pruning does not really hurt the performance in both domains. Table 1 illustrates pruning ratio of each layer and the accuracy for pruned models. The accuracy is evaluated using spatial domain convolution (referred to as "Cony") or using Winograd convolution (referred to as "WConv") for Conv2 to Conv5 layers.

TABLE 1

Accuracy of pruned AlexNet models.

| Regularization (rate) | Pruning (rate) | Final pruned weight percentage (%) | | | | | | | | Top-1/Top-5 accuracy (%) |
|---|---|---|---|---|---|---|---|---|---|---|
| | | Conv1 | Conv2 | Conv3 | Conv4 | Conv5 | FC1 | FC2 | FC3 | |
| Baseline model | | 15.0 | 55.0 | 55.0 | 55.0 | 55.0 | 93.0 | 92.0 | 80.0 | 57.3/80.2 |
| SD (60%) | SD (60%) | 15.0 | 59.0 | 62.8 | 58.7 | 57.0 | 93.0 | 92.0 | 80.0 | 57.6/80.6 |
| SD (70%) | SD (70%) | 15.0 | 69.5 | 74.5 | 68.1 | 64.1 | 93.0 | 92.0 | 80.0 | 57.4/80.4 |
| SD (80%) | SD (80%) | 15.0 | 78.9 | 84.4 | 78.6 | 74.2 | 93.0 | 92.0 | 80.0 | 56.8/80.1 |
| SD (90%) | SD (90%) | 15.0 | 87.8 | 93.0 | 89.7 | 86.0 | 93.0 | 92.0 | 80.0 | 55.0/78.7 |
| SD + WD (60%) | SD (60%) | 15.0 | 39.7 | 67.4 | 60.1 | 59.2 | 93.0 | 92.0 | 80.0 | 57.0/80.1 |
| SD + WD (70%) | SD (70%) | 15.0 | 50.7 | 77.5 | 70.6 | 67.7 | 93.0 | 92.0 | 80.0 | 56.5/79.7 |

TABLE 1-continued

Accuracy of pruned AlexNet models.

| | | | | | | | | | | |
|---|---|---|---|---|---|---|---|---|---|---|
| SD + WD (80%) | SD (80%) | 15.0 | 64.0 | 86.0 | 81.1 | 77.6 | 93.0 | 92.0 | 80.0 | 55.2/78.9 |
| SD + WD (90%) | SD (90%) | 15.0 | 77.1 | 94.0 | 91.7 | 88.5 | 93.0 | 92.0 | 80.0 | 52.5/76.4 |

*Spatial-domain convolution is used for Conv2-Conv5 in accuracy evaluation

| Regularization | Pruning | Final pruned weight percentage (%) | | | | | | | | Top-1/Top-5 |
|---|---|---|---|---|---|---|---|---|---|---|
| (rate) | (rate) | Conv1 | WConv2 | WConv3 | WConv4 | WConv5 | FC1 | FC2 | FC3 | accuracy (%) |
| SD (60%) | WD (60%) | 15.0 | 64.0 | 63.7 | 57.1 | 55.0 | 93.0 | 92.0 | 80.0 | 0.33/1.18 |
| SD (70%) | WD (70%) | 15.0 | 72.9 | 74.6 | 67.1 | 63.8 | 93.0 | 92.0 | 80.0 | 0.30/1.18 |
| SD (80%) | WD (80%) | 15.0 | 81.5 | 84.3 | 77.9 | 73.9 | 93.0 | 92.0 | 80.0 | 0.22/1.05 |
| SD (90%) | WD (90%) | 15.0 | 89.6 | 92.9 | 89.2 | 85.5 | 93.0 | 92.0 | 80.0 | 0.18/0.87 |
| SD + WD (60%) | SD (60%) | 15.0 | 49.4 | 65.6 | 57.4 | 57.6 | 93.0 | 92.0 | 80.0 | 57.0/80.1 |
| SD + WD (70%) | SD (70%) | 15.0 | 58.4 | 75.4 | 68.1 | 67.2 | 93.0 | 92.0 | 80.0 | 56.5/79.7 |
| SD + WD (80%) | SD (80%) | 15.0 | 68.9 | 84.4 | 79.1 | 77.4 | 93.0 | 92.0 | 80.0 | 55.2/78.9 |
| SD + WD (90%) | SD (90%) | 15.0 | 80.2 | 93.0 | 90.3 | 88.0 | 93.0 | 92.0 | 80.0 | 52.5/76.4 |

*Winograd convolution is used for Conv2-Conv5 in accuracy evaluation

After training as above, the system prunes the trained CNN model in the spatial domain. The system further applies quantization and universal CNN compression for the pruned AlexNet model by taking two models with the pruning rate of 70% in the previous experiments. The system compares uniform quantization (UQ) and dithered uniform quantization (DUQ).

The system examines different cell sizes in {0.005,0.01, 0.015,0.02}. The larger the cell size, the larger the compression ratio but the accuracy loss also becomes larger. The system further fine-tunes the codebook after quantization with the present Winograd domain partial L2 regularization and the model is compressed using entropy compression scheme.

The system further decompresses the CNN model that provides a quantized CNN model that is sparse in the spatial domain. Even though the model is sparse in the spatial domain, the training and codebook fine-tuning with the Winograd domain partial L2 regularization allows the model to be transformed into the Winograd domain, then prune it in the Winograd domain to make it sparse in the Winograd domain as well at little accuracy loss.

Table 2 illustrates accuracy and compression ratios for different cell sizes. The accuracy is evaluated using sparse spatial domain convolution in Table 2. It is observed that the pruning ratio increases after quantization since some non-zero weights are quantized to zero. The small or zero weights are kept to be zero while fine-tuning the codebook. The other non-zero weights are updated when their codebook is fine-tuned,

TABLE 2

Accuracy and compression ratio of compressed AlexNet models.

| Regularization | Quantization | Final pruned weight percentage (%) | | | | | | | | Top-1/Top-5 | Compression |
|---|---|---|---|---|---|---|---|---|---|---|---|
| (rate) | (cell size) | Conv1 | Conv2 | Conv3 | Conv4 | Conv5 | FC1 | FC2 | FC3 | accuracy (%) | ratio |
| SD | UQ (0.005) | 15.6 | 69.5 | 74.5 | 68.1 | 64.1 | 93.2 | 92.1 | 80.2 | 57.4/80.6 | 42.0 |
| (70%) | UQ (0.010) | 17.1 | 69.5 | 74.5 | 68.1 | 64.1 | 93.5 | 92.3 | 80.5 | 57.1/80.3 | 48.9 |
| | UQ (0.015) | 20.6 | 69.5 | 74.6 | 68.1 | 64.1 | 94.1 | 92.6 | 81.0 | 56.6/79.9 | 56.5 |
| | UQ (0.020) | 25.6 | 69.6 | 74.6 | 68.1 | 64.2 | 95.1 | 93.2 | 81.9 | 55.4/78.9 | 64.7 |
| | DUQ (0.005) | 15.7 | 69.5 | 74.5 | 68.1 | 64.1 | 93.2 | 92.1 | 80.2 | 57.4/80.5 | 42.0 |
| | DUQ (0.010) | 18.4 | 69.5 | 74.6 | 68.1 | 64.1 | 93.7 | 12.4 | 80.6 | 57.0/80.2 | 49.2 |
| | DUQ (0.015) | 22.4 | 69.6 | 74.6 | 68.2 | 64.2 | 94.6 | 93.0 | 81.5 | 56.1/79.3 | 57.5 |
| | DUQ (0.020) | 27.0 | 69.9 | 74.9 | 68.5 | 64.4 | 95.5 | 93.8 | 82.9 | 54.2/78.3 | 66.9 |
| SD + WD | UQ (0.005) | 15.6 | 62.8 | 81.2 | 75.0 | 71.7 | 93.2 | 92.1 | 80.2 | 56.4/79.7 | 42.7 |
| (70%) | UQ (0.010) | 17.2 | 68.3 | 81.9 | 76.0 | 72.6 | 93.5 | 92.3 | 80.5 | 56.2/79.5 | 49.8 |
| | UQ (0.015) | 20.6 | 71.6 | 82.5 | 76.8 | 73.2 | 94.1 | 92.6 | 80.9 | 55.3/79.0 | 57.5 |
| | UQ (0.020) | 25.5 | 73.7 | 83.0 | 77.4 | 73.8 | 94.9 | 93.1 | 81.7 | 54.2/78.0 | 66.0 |
| | DUQ (0.005) | 15.8 | 62.0 | 80.9 | 74.7 | 71.4 | 93.2 | 92.1 | 80.2 | 56.5/79.8 | 42.6 |
| | DUQ (0.010) | 18.3 | 66.7 | 81.7 | 75.7 | 72.3 | 93.7 | 92.3 | 80.6 | 56.0/79.3 | 50.0 |
| | DUQ (0.015) | 22.4 | 69.6 | 82.4 | 76.6 | 73.0 | 94.5 | 92.9 | 81.4 | 55.0/78.7 | 58.4 |
| | DUQ (0.020) | 26.8 | 71.9 | 83.1 | 77.5 | 73.9 | 95.4 | 93.6 | 82.6 | 52.9/77.0 | 68.0 |

Table 3 illustrates accuracy of the compressed AlexNet models when using sparse WConv for Conv2 to Conv5 layers. The system compresses AlexNet models in the spatial domain. The model is decompressed and weights in Conv2 to Conv5 layers are transformed to the Winograd domain. Then small magnitude weights are pruned in the Winograd domain for sparse Winograd convolution. The results show that the regularized AlexNet model produces sparse Winograd domain filters even after quantization although there are some losses due to quantization errors.

TABLE 3

Accuracy of compressed AlexNet models, using sparse Winograd convolution.

| Regularization (rate) | Quantization (cell size) | Pruning (rate) | Conv1 | WConv2 | WConv3 | WConv4 | WConv5 | FC1 | FC2 | FC3 | Top-1/Top-5 accuracy (%) |
|---|---|---|---|---|---|---|---|---|---|---|---|
| SD (70%) | UQ (0.010) | 50% | 17.1 | 54.4 | 55.5 | 45.8 | 43.5 | 93.5 | 92.3 | 80.5 | 2.4/5.8 |
| | | 55% | 17.1 | 60.8 | 60.1 | 50.9 | 48.4 | 93.5 | 92.3 | 80.5 | 1.0/2.8 |
| | | 60% | 17.1 | 65.5 | 65.0 | 56.2 | 53.4 | 93.5 | 92.3 | 80.5 | 0.5/1.6 |
| | | 65% | 17.1 | 67.9 | 70.4 | 62.2 | 58.9 | 93.5 | 92.3 | 80.5 | 0.3/1.3 |
| | | 70% | 17.1 | 73.2 | 74.6 | 67.1 | 63.8 | 93.5 | 92.3 | 80.5 | 0.3/1.1 |
| | DUQ (0.010) | 50% | 18.4 | 54.3 | 55.4 | 45.8 | 43.5 | 93.7 | 92.4 | 80.6 | 2.3/5.7 |
| | | 55% | 18.4 | 60.1 | 60.2 | 51.0 | 48.4 | 93.7 | 92.4 | 80.6 | 1.0/2.7 |
| | | 60% | 18.4 | 65.1 | 65.0 | 56.2 | 53.4 | 93.7 | 92.4 | 80.6 | 0.6/1.8 |
| | | 65% | 18.4 | 69.2 | 69.8 | 61.7 | 58.5 | 93.7 | 92.4 | 80.6 | 0.4/1.3 |
| | | 70% | 18.4 | 72.9 | 74.6 | 67.2 | 63.8 | 93.7 | 92.4 | 80.6 | 0.3/1.2 |
| SD + WD (70%) | UQ (0.010) | 50% | 17.2 | 42.4 | 69.0 | 60.1 | 58.7 | 93.5 | 92.3 | 80.5 | 56.2/79.5 |
| | | 55% | 17.2 | 42.4 | 69.0 | 60.1 | 58.7 | 93.5 | 92.3 | 80.5 | 56.2/79.5 |
| | | 60% | 17.2 | 42.4 | 69.0 | 60.1 | 58.7 | 93.5 | 92.3 | 80.5 | 56.2/79.5 |
| | | 65% | 17.2 | 43.6 | 72.0 | 63.7 | 62.4 | 93.5 | 92.3 | 80.5 | 56.2/79.5 |
| | | 70% | 17.2 | 59.7 | 75.4 | 68.1 | 66.7 | 93.5 | 92.3 | 80.5 | 52.6/76.4 |
| | DUQ (0.010) | 50% | 18.3 | 42.3 | 69.0 | 60.1 | 58.7 | 93.7 | 92.3 | 80.6 | 56.0/79.3 |
| | | 55% | 18.3 | 42.3 | 69.0 | 60.1 | 58.7 | 93.7 | 92.3 | 80.6 | 56.0/79.3 |
| | | 60% | 18.3 | 42.3 | 69.0 | 60.1 | 58.7 | 93.7 | 92.3 | 80.6 | 56.0/79.3 |
| | | 65% | 18.3 | 47.2 | 71.7 | 63.4 | 62.0 | 93.7 | 92.3 | 80.6 | 56.1/79.3 |
| | | 70% | 18.3 | 61.0 | 75.3 | 67.9 | 66.5 | 93.7 | 92.3 | 80.6 | 41.7/66.1 |

Figure 4:
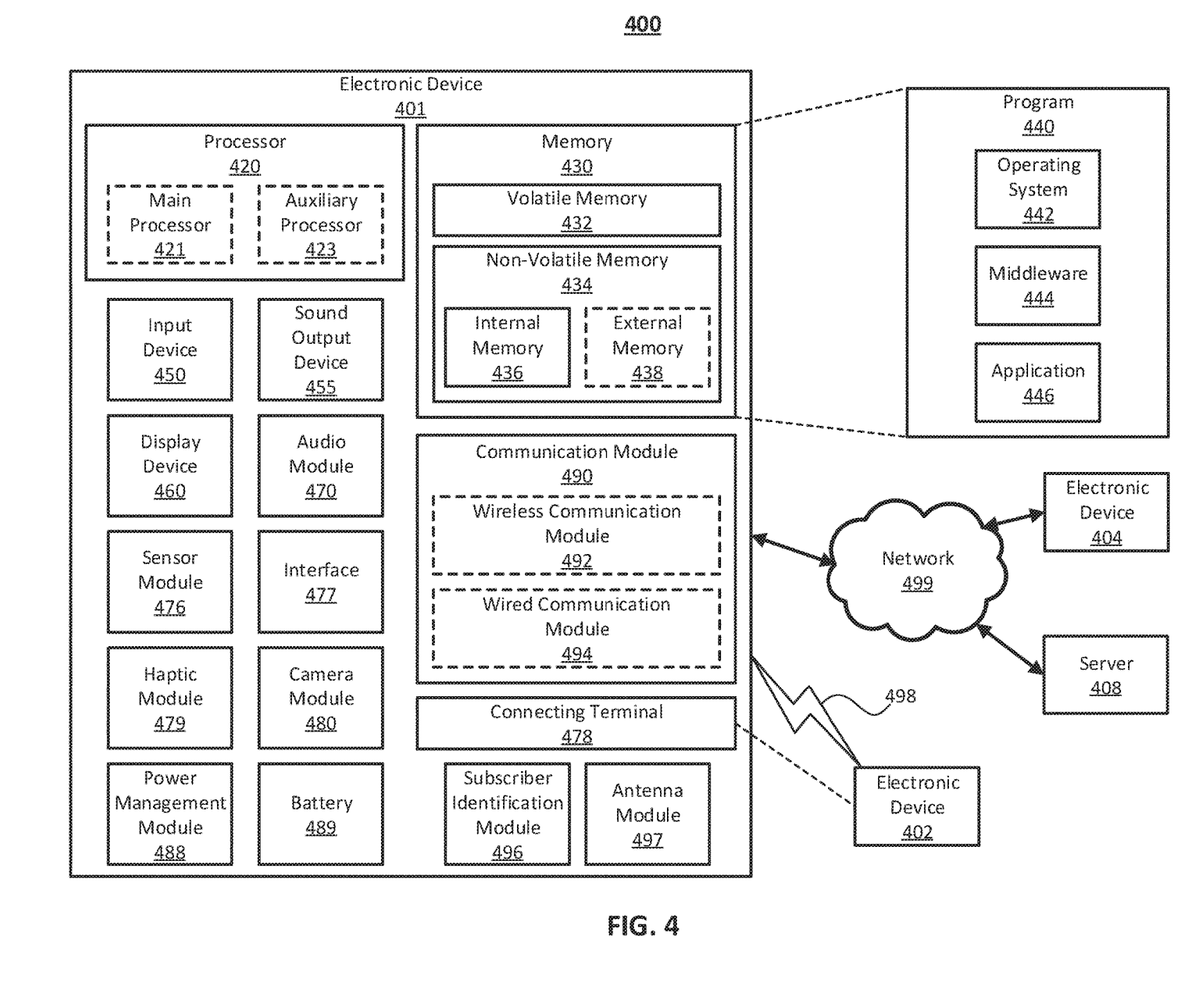
FIG. 4 is a block diagram of an electronic device in a network environment, according to one embodiment.

FIG. 4 is a block diagram of an electronic device 401 in a network environment 400, according to one embodiment. Referring to FIG. 4, the electronic device 401 in the network environment 400 may communicate with an electronic device 402 via a first network 498 (e.g., a short-range wireless communication network), or an electronic device 404 or a server 408 via a second network 499 (e.g., a long-range wireless communication network). The electronic device 401 may communicate with the electronic device 404 via the server 408. The electronic device 401 may include a processor 420, a memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In one embodiment, at least one (e.g., the display device 460 or the camera module 480) of the components may be omitted from the electronic device 401, or one or more other components may be added to the electronic device 401. In one embodiment, some of the components may be implemented as a single integrated circuit (IC). For example, the sensor module 476 (e.g., a fingerprint sensor, an iris sensor, or an illuminance sensor) may be embedded in the display device 460 (e.g., a display).

The processor 420 may execute, for example, software (e.g., a program 440) to control at least one other component (e.g., a hardware or a software component) of the electronic device 401 coupled with the processor 420, and may perform various data processing or computations. As at least part of the data processing or computations, the processor 420 may load a command or data received from another component (e.g., the sensor module 476 or the communication module 490) in volatile memory 432, process the command or the data stored in the volatile memory 432, and store resulting data in non-volatile memory 434. The processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421, or execute a particular function. The auxiliary processor 423 may be implemented as being separate from, or a part of, the main processor 421.

The auxiliary processor 423 may control at least some of the functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to one embodiment, the auxiliary processor 423 (e.g., an image signal processor or a communication processor) may be implemented as part of another component (e.g., the camera module 480 or the communication module 490) functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thererto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, or a keyboard.

The sound output device 455 may output sound signals to the outside of the electronic device 401. The sound output device 455 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to one embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to one embodiment, the audio module 470 may obtain the sound via the input device 450, or output the sound via the sound output device 455 or a headphone of an external electronic device 402 directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. The sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device 402 directly (e.g., wiredly) or wirelessly. According to one embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device 402. According to one embodiment, the connecting terminal 478 may include, for example, an HDMI connector, a USB connector, an SD card connector, or an audio connector (e.g., a headphone connector).

The haptic module 479 may convert an electrical signal into a mechanical stimulus (e.g., a vibration or a movement) or an electrical stimulus which may be recognized by a user via tactile sensation or kinesthetic sensation. According to one embodiment, the haptic module 479 may include, for example, a motor, a piezoelectric element, or an electrical stimulator.

The camera module 480 may capture a still image or moving images. According to one embodiment, the camera module 480 may include one or more lenses, image sensors, image signal processors, or flashes.

The power management module 488 may manage power supplied to the electronic device 401. The power management module 488 may be implemented as at least part of, for example, a power management integrated circuit (PMIC).

The battery 489 may supply power to at least one component of the electronic device 401. According to one embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the AP) and supports a direct (e.g., wired) communication or a wireless communication. According to one embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or a standard of the Infrared Data Association (IrDA)) or the second network 499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 492 may identify and authenticate the electronic device 401 in a communication network, such as the first network 498 or the second network 499, using subscriber information (e.g., international mobile subscriber identity (IMSI)) stored in the subscriber identification module 496.

The antenna module 497 may transmit or receive a signal or power to or from the outside (e.g., the external electronic device) of the electronic device 401. According to one embodiment, the antenna module 497 may include one or more antennas, and, therefrom, at least one antenna appropriate for a communication scheme used in the communication network, such as the first network 498 or the second network 499, may be selected, for example, by the communication module 490 (e.g., the wireless communication module 492). The signal or the power may then be transmitted or received between the communication module 490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. All or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

One embodiment may be implemented as software (e.g., the program 440) including one or more instructions that are stored in a storage medium (e.g., internal memory 436 or external memory 438) that is readable by a machine (e.g., the electronic device 401). For example, a processor of the electronic device 401 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 5:
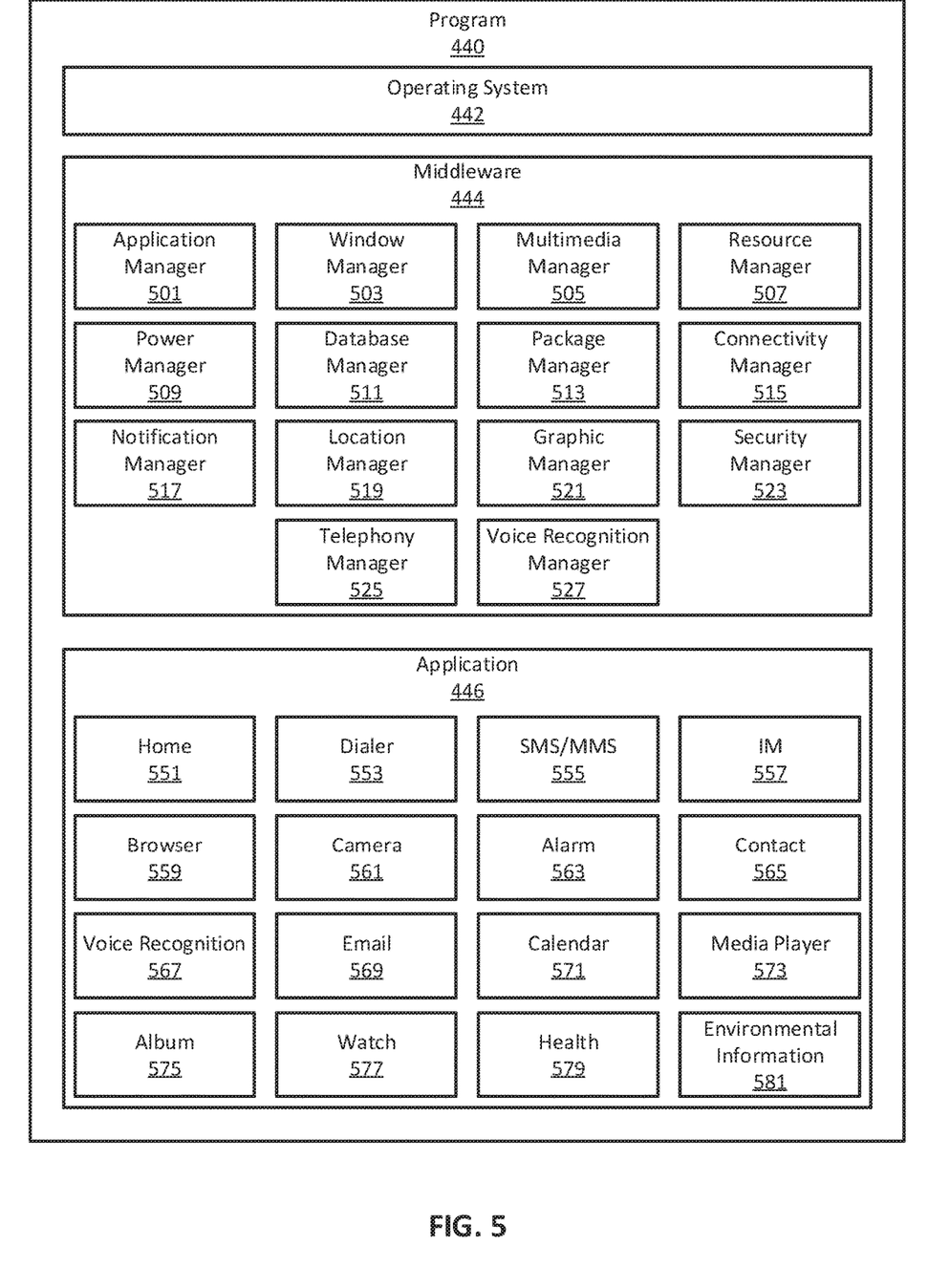
FIG. 5 is a block diagram of a program, according to one embodiment.

FIG. 5 is a block diagram of the program 440 according to one embodiment. Referring to FIG. 5, the program 440 may include an OS 442 to control one or more resources of the electronic device 401, middleware 444, or an application 446 executable in the OS 442. The OS 442 may include, for example, Android®, iOS®, Windows®, Symbian®, Tizen®, or Bada. At least part of the program 440, for example, may be pre-loaded on the electronic device 401 during manufacture, or may be downloaded from or updated by an external electronic device (e.g., the electronic device 402 or 404, or the server 408) during use by a user.

The OS 442 may control management (e.g., allocating or deallocation) of one or more system resources (e.g., process, memory, or power source) of the electronic device 401. The OS 442, additionally or alternatively, may include one or more driver programs to drive other hardware devices of the electronic device 401, for example, the input device 450, the sound output device 455, the display device 460, the audio module 470, the sensor module 476, the interface 477, the haptic module 479, the camera module 480, the power management module 488, the battery 489, the communication module 490, the subscriber identification module 496, or the antenna module 497.

The middleware 444 may provide various functions to the application 446 such that a function or information provided from one or more resources of the electronic device 401 may be used by the application 446. The middleware 444 may include, for example, an application manager 501, a window manager 503, a multimedia manager 505, a resource manager 507, a power manager 509, a database manager 511, a package manager 513, a connectivity manager 515, a notification manager 517, a location manager 519, a graphic manager 521, a security manager 523, a telephony manager 525, or a voice recognition manager 527.

The application manager 501, for example, may manage the life cycle of the application 446. The window manager 503, for example, may manage one or more graphical user interface (GUI) resources that are used on a screen. The multimedia manager 505, for example, may identify one or more formats to be used to play media files, and may encode or decode a corresponding one of the media files using a codec appropriate for a corresponding format selected from the one or more formats. The resource manager 507, for example, may manage the source code of the application 446 or a memory space of the memory 430. The power manager 509, for example, may manage the capacity, temperature, or power of the battery 489, and determine or provide related information to be used for the operation of the electronic device 401 based at least in part on corresponding information of the capacity, temperature, or power of the battery 489. The power manager 509 may interoperate with a basic input/output system (BIOS) of the electronic device 401.

The database manager 511, for example, may generate, search, or change a database to be used by the application 446. The package manager 513, for example, may manage installation or update of an application that is distributed in the form of a package file. The connectivity manager 515, for example, may manage a wireless connection or a direct connection between the electronic device 401 and the external electronic device. The notification manager 517, for example, may provide a function to notify a user of an occurrence of a specified event (e.g., an incoming call, message, or alert). The location manager 519, for example, may manage locational information on the electronic device 401. The graphic manager 521, for example, may manage one or more graphic effects to be offered to a user or a user interface related to the one or more graphic effects.

The security manager 523, for example, may provide system security or user authentication. The telephony manager 525, for example, may manage a voice call function or a video call function provided by the electronic device 401. The voice recognition manager 527, for example, may transmit a user's voice data to the server 408, and receive, from the server 408, a command corresponding to a function to be executed on the electronic device 401 based at least in part on the voice data, or text data converted based at least in part on the voice data. The middleware 444 may dynamically delete some existing components or add new components. At least part of the middleware 444 may be included as part of the OS 442 or may be implemented in other software separate from the OS 442.

The application 446 may include, for example, a home application 551, a dialer application 553, a short message service (SMS)/multimedia messaging service (MMS) application 555, an instant message (IM) application 557, a browser application 559, a camera application 561, an alarm application 563, a contact application 565, a voice recognition application 567, an email application 569, a calendar application 571, a media player application 573, an album application 575, a watch application 577, a health application 579 (e.g., for measuring the degree of workout or biometric information, such as blood sugar), or an environmental information application 581 (e.g., for measuring air pressure, humidity, or temperature information). The application 446 may further include an information exchanging application that is capable of supporting information exchange between the electronic device 401 and the external electronic device. The information exchange application, for example, may include a notification relay application adapted to transfer designated information (e.g., a call, a message, or an alert) to the external electronic device or a device management application adapted to manage the external electronic device. The notification relay application may transfer notification information corresponding to an occurrence of a specified event (e.g., receipt of an email) at another application (e.g., the email application 569) of the electronic device 401 to the external electronic device. Additionally or alternatively, the notification relay application may receive notification information from the external electronic device and provide the notification information to a user of the electronic device 401.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of constructing a convolutional neural network (CNN) model to process an image, comprising:
    regularizing spatial domain weights across at least one portion of the image;
    providing quantization of the spatial domain weights;
    pruning small weights in a spatial domain across the at least one portion of the image;
    fine-tuning a quantization codebook based on the quantized spatial domain weights and the small weights in the spatial domain;
    compressing a quantization output from the quantization codebook;
    decompressing the quantization output using either sparse spatial domain convolution and sparse Winograd convolution after pruning Winograd-domain weights; and
    processing the image using the CNN model,
    wherein, if Winograd convolution is supported, the spatial domain weights are converted to the Winograd-domain weights, pruned to a desired sparsity level, and used to perform Winograd convolution.

2. The method of claim 1, wherein the spatial domain weights are regularized using Winograd domain regularization.

3. The method of claim 2, wherein regularizing the spatial domain weights further comprises using a learnable Winograd domain regularization coefficient and its penalty term.

4. The method of claim 2, wherein regularizing the spatial domain weights further comprises defining a cost function with the Winograd domain regularizer and utilizing a gradient descent.

5. The method of claim 1, wherein the spatial domain weights are regularized using spatial domain regularization.

6. The method of claim 5, wherein regularizing the spatial domain weights further comprises using a learnable spatial domain regularization coefficient and its penalty term.

7. The method of claim 5, wherein regularizing the spatial domain weights further comprises defining a cost function with the spatial domain regularizer and utilizing a gradient descent.

8. The method of claim 1, wherein the quantization codebook is fine-tuned with Winograd domain regularization having non-zero code values and a quantized value is updated in the quantization codebook by gradient descent using an average gradient.

9. The method of claim 1, wherein the CNN is operated in either the spatial domain or the Winograd domain after pruning.

10. The method of claim 1, wherein decompressing further comprises transforming decompressed spatial domain filters to the Winograd domain and pruning the Winograd domain weights.

11. A system for constructing a convolutional neural network (CNN) model to process an image, comprising:
    a processor; and
    a non-transitory computer readable storage medium configured to store instructions that, when executed, cause the processor to:
        regularize spatial domain weights across at least one portion of the image;
        provide quantization of the spatial domain weights;
        prune small weights in a spatial domain across the at least one portion of the image;
        fine-tune a quantization codebook based on the quantized spatial domain weights and the small weights in the spatial domain;
        compress a quantization output from the quantization codebook;
        process the image using the CNN model; and decompress the quantization output and use either sparse spatial domain convolution and sparse Winograd convolution after pruning Winograd-domain weights, wherein, if Winograd convolution is supported, the spatial domain weights are converted to the Winograd-domain weights, pruned to a desired sparsity level, and used to perform Winograd convolution.

12. The system of claim 11, wherein the spatial domain weights are regularized using Winograd domain regularization.

13. The system of claim 12, wherein the instructions, when executed, further cause the processor to regularize the spatial domain weights by using a learnable Winograd domain regularization coefficient and its penalty term.

14. The system of claim 12, wherein the instructions, when executed, further cause the processor to regularize the spatial domain weights by defining a cost function with the Winograd domain regularizer and using a gradient descent.

15. The system of claim 11, wherein the spatial domain weights are regularized using spatial domain regularization.

16. The system of claim 15, wherein the instructions, when executed, further cause the processor to regularize by using a learnable spatial domain regularization coefficient and its penalty term.

17. The system of claim 15, wherein the instructions, when executed, further cause the processor to regularize the spatial domain weights by defining a cost function with the spatial domain regularizer and using a gradient descent.

18. The system of claim 11, wherein the quantization codebook is fine-tuned with Winograd domain regularization and a quantized value is updated in the quantization codebook by gradient descent using an average gradient.

19. The system of claim 11, wherein the CNN is operated in either the spatial domain or the Winograd domain after pruning.

20. The system of claim 11, wherein the instructions, when executed, further cause the processor to decompress by transforming decompressed spatial domain filters to the Winograd domain and pruning the Winograd domain weights.

* * * * *